(No Model.)

R. J. WELLES.
HARNESS CHECK HOOK.

No. 316,510. Patented Apr. 28, 1885.

Witnesses
Irving A. Weston
F. H. Sherman

Inventor
R. J. Welles

UNITED STATES PATENT OFFICE.

RICHARD J. WELLES, OF ATHENS, PENNSYLVANIA.

HARNESS CHECK-HOOK.

SPECIFICATION forming part of Letters Patent No. 316,510, dated April 28, 1885.

Application filed September 13, 1884. (No model.)

*To all whom it may concern:*

Be it known that I, RICHARD J. WELLES, a citizen of the United States, residing at Athens, in the county of Bradford, State of Pennsylvania, have invented a new and useful Harness Check-Hook, of which the following is a specification.

My invention consists of certain details of structure, hereinafter described and claimed, and illustrated in the accompanying drawings, in which—

Figure 1:
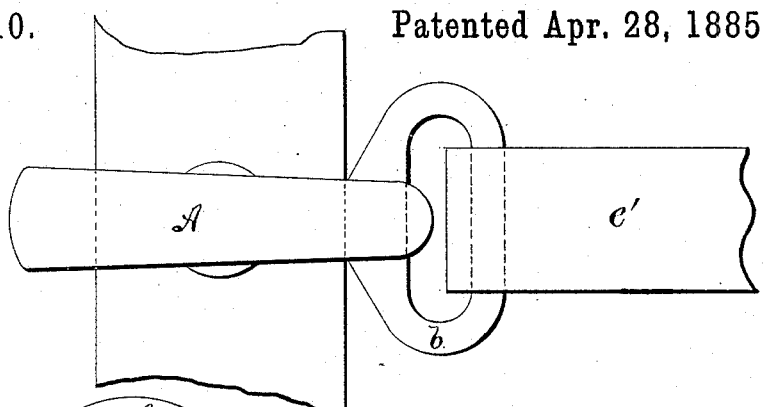
Figure 2:
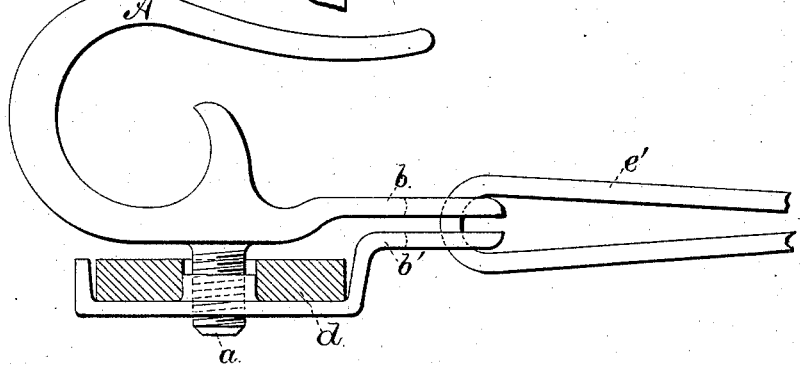
Figure 3:
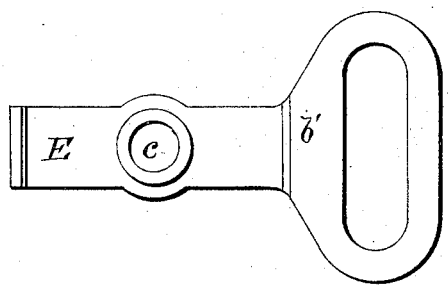
Figure 4:
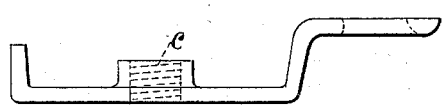

Figure 1 is a top view of the check-hook fastened upon the back-strap with the crupper-strap e' in position through the double-loops b and b'. Fig. 2 is a side elevation of the check-hook A, showing the construction and shape of both the upper and lower parts, with the leather back-strap in cross-section in its place between the two parts which are not screwed down quite to place. Fig. 3 shows a top view of the under piece or lower half-loop, E. Fig. 4 is an edge view of the same, showing the recessed or depressed part for the back-strap.

The check-hook consists of two parts, the upper part, A, being of a shape to retain the check-rein in the hook curved portion, and at the back end it has a loop, b, through which the crupper-strap e' passes. The lower piece, E, Fig. 3, has a sunken recess for the strap or back-band and a raised loop, b', upon its rear end, through which the crupper-strap e' is passed. When the two parts are screwed together, the back-strap d lies between and the crupper-strap passes through the loops b and b' of both and keys them fast, so that neither part can turn until the crupper-strap is first removed. I simply punch a hole in the back-band strap, and placing the part E, Fig. 3, under the back-strap, the upper or hook part is placed on top, the screw-threaded shank A, Fig. 2, is put through the hole in the leather and screwed into the hole c in the lower part, E, Fig. 3, by turning the hook part until screwed tight, and so the two crupper-strap loops b and b', Fig. 2, coincide when the crupper-strap e', Fig. 2, is put through both. This completes and secures the hook in its place without any rivets or sewing, and it is impossible to release it until the crupper-strap e' is first removed from the loops b and b'.

Having thus fully described the device, what I claim as my invention, and wish to secure by Letters Patent, is—

1. A harness check-hook composed of the upper hook part, A, and the lower loop-piece, E, constructed substantially as described and arranged to screw together, so that their crupper-strap loops shall coincide and admit the crupper-strap through both the upper and lower loops, for the purpose shown and described.

2. In a harness check-hook, the upper hook part, A, having the crupper-strap loop b on one end and the screw-threaded shank a on its under side, in combination with the lower part, E, having the screw-threaded hole c and crupper-loop b', substantially as shown and described.

3. In a harness-pad, the combination of the upper hook part, A, having the crupper-loop b on one end, the screw-threaded shank a on its under side, the under part, E, with the screw-threaded hole c and loop b' on one end, in combination with the back-strap d, for the purpose shown and described.

RICHARD J. WELLES.

Witnesses:
IRVING A. WESTON,
F. H. SHERMAN.